United States Patent [19]

Eggers

[11] 4,017,324
[45] Apr. 12, 1977

[54] CLAY SLURRIES

[75] Inventor: Warren J. Eggers, Aurora, Ill.

[73] Assignee: IMC Chemical Group, Inc., Terre Haute, Ind.

[22] Filed: Feb. 19, 1974

[21] Appl. No.: 443,560

[52] U.S. Cl. .............................. 106/288 B; 106/72
[51] Int. Cl.² ..................... C09D 1/02; C04B 33/04
[58] Field of Search ........................ 106/72, 288 B

[56] References Cited

UNITED STATES PATENTS

| | | | |
|---|---|---|---|
| 2,772,981 | 12/1956 | Smart | 106/72 |
| 2,904,267 | 9/1959 | Lyons | 106/72 |
| 3,130,063 | 4/1964 | Millman et al. | 106/288 B |
| 3,236,666 | 2/1966 | Sawyer, Jr. | 106/288 B |
| 3,506,594 | 4/1970 | Haden et al. | 252/455 |
| 3,586,523 | 6/1971 | Fanselow et al. | 106/72 |
| 3,594,203 | 7/1971 | Sawyer, Jr. et al. | 106/288 B |
| 3,846,147 | 11/1974 | Tapper | 106/288 B |

*Primary Examiner*—J. Poer
*Assistant Examiner*—William G. Wright
*Attorney, Agent, or Firm*—Robert H. Dewey; Howard E. Post

[57] ABSTRACT

A clay slurry containing 50% or more of non-volatile solids comprising calcined kaolin clay and from 8 – 33⅓% of hydrated kaolin clay based on the weight of the calcined clay. Additionally the slurry contains from 0.01% to 10% of a suspending agent such as bentonite clay, hydroxyethyl cellulose, methyl cellulose, carboxymethyl cellulose and a dispersant such as a non-ionic surfactant, an anionic surfactant or an alkanolamine.

3 Claims, No Drawings

CLAY SLURRIES

BACKGROUND OF THE INVENTION

This invention relates to clay slurries. In a particular aspect this invention relates to slurries of calcined clay and hydrite clay.

Kaolin is a fine, white clay, essentially a hydrated aluminum silicate, commonly known as hydrite clay which is used in large volume for the production of coatings, such as paper coatings and paints. Calcined kaolin is obtained by heating the naturally occurring hydrite to dryness. The calcined kaolin is brighter than the naturally occurring hydrite and contributes a higher degree of opacity to the coating. Once dehydrated, calcined clay does not revert to the hydrite form in the presence of water, but retains its advantageous properties.

Many pigments and extenders intended for use in water-based paints and coatings are shipped as high-solids aqueous slurries because of the economic advantages that accure from bulk shipping and handling. However, calcined kaolin cannot be satisfactorily maintained as a high-solids slurry due to its tendency to readily settle out and cake. There is a need for a high-solids slurry, however, because it would make it possible to ship and handle the slurry like a liquid, thereby greatly reducing packaging and handling costs. The use of a slurry also reduces manufacturing time of the coating and eliminates the problem of dust fumes in the atmosphere.

SUMMARY OF THE INVENTION

It is an object of this invention to provide clay slurries.

It is another object of this invention to provide calcined clay slurries having exceptionally high-solids content.

Other objects of this invention will be apparent to those skilled in the art from the description herein.

It is the discovery of this invention to provide aqueous slurries of calcined clay consisting essentially of calcined and hydrite clay in a proportion of about 2 to about 5.25 parts of calcined clay to about 1 part of hydrite clay, said slurry having a total clay content of less than about 75% by weight. Another way of expressing the clay ratios is to say that the hydrite portion of the clay is from about 16% to about 33.3% of the total clay. These slurries provide a total clay content of from about 50% to about 75%.

DETAILED DISCUSSION

The ratio of calcined clay to the hydrite is varied in accordance with the total clay solids desired in the slurry, as is shown in the examples. For a 50% clay slurry, a ratio of 5.25:1 is preferred, but for a 75% slurry, a ratio of about 2.75:1 is preferred. For most uses, slurries of about 70% or above are too viscous for easy handling. Accordingly the preferred slurries are about 60 to about 70%, and 65% is particularly preferred. The ratio of calcined clay to hydrite in such a slurry preferably is about 2-3:1.

The slurries of the present invention are easily prepared by conventional methods. Generally one or more suspending agents and one or more dispersants are employed, as is known. The selected suspending agent and dispersant are mixed with the amount of water required and then the calcined clay portion is slowly added with agitation. After it is well-dispersed, the hydrite portion is added and agitation is continued for a time sufficient to provide a reasonably homogeneous slurry. It is then ready for storage, shipment or use.

The materials used in the practice of this invention are known in the art, and the usual commercial materials are satisfactory. Both calcined clay and hydrite clay are common articles of commerce.

The suspending agent can be any of the art recognized suspending agents. It is not intended that the invention be limited to any particular such agent. Typical products include, but are not limited to, bentonite clay, hydroxyethyl cellulose, methyl cellulose, carboxymethyl cellulose, sodium alganate, casein, soya protein, etc. The suspending agent is generally used in a concentration of from 0.01% to 5%, usually about 0.05% of the total weight of the slurry.

The dispersant used in the practice of this invention can be any of the commonly known dispersants. It is not intended that the practice of this invention be limited to any particular dispersant. Suitable dispersants include non-ionic surface active agents, such as the polyoxyethylene ethers, anionic surface agents, such as salts of alkyl aryl sulfonates, alkali and alkanolamine soaps of fatty acids and polyacrylate salts. Any of the art-recognized alkanolamines can be used. They include but are not limited to 2-amino-2-methyl-1-propanol; mono-, di- or triethanolamine; the isopropanolamines; N-alkylated ethanolamines. An amount generally of from 0.2% to 2.0% of the total slurry weight is suitable.

The practice of this invention can be better understood with reference to the following examples. It is understood that the examples are intended for illustration only, and it is not intended that the invention be limited thereby.

EXAMPLES 1-6

Six slurries having from 50% to 75% non-volatile matter were prepared. The ratios of calcined clay to hydrite clay varied from 2 to more than 5. The slurries were prepared by first dissolving the suspending agent, as shown in Table 1, in a small amount of water, then the remainder of the water was delivered to a mixing vessel equipped with an agitation means. The dispersant, as shown in Table 1, was added with agitation, then the suspending agent. The calcined clay was added slowly and the mixture was agitated at high speed for 1 minute, then the hydrite clay was slowly added. After mixing another 1-2 min. the slurry was drawn off into suitable containers. The viscosity ranged from 250-2000 centipoise as determined with a Brookfield viscometer at 60 rpm. All were pumpable and were determined to be suitable for bulk transport. They exhibited minimum settling after ageing for 2 to 4 weeks. Any settling that did occur could be easily resuspended by gentle shaking for 1 minute or less.

The formulas used are given in Table 1 and the compositions of the slurries prepared thereby are given in Table 2. Tamol-731 is the sodium salt of a polymeric carboxylic acid. Triton X-100 is isooctylphenoxy polyethoxyethanol containing 10 moles of ethylene oxide; both are manufactured by Rohm and Haas Co., Philadelphia, Pa.

TABLE 1

| EXAMPLE No. | 1 | 2 | 3 | 4 | 5 | 6 |
|---|---|---|---|---|---|---|
| Clay, hydrite, g | 40 g | 60 g | 100 g | 80 g | 87.5 g | 100 g |
| Clay, calcined, g | 210 | 240 | 200 | 245 | 262.5 | 275 |
| Water, g | 248 | 197.75 | 197.75 | 168.25 | 146.25 | 119.70 |
| Dispersant, g | 1[1] | 2.0[3] | 2.5[5] | 6.5[7] | 3.5[10] | 5.25[9] |
| Suspending agent, g | 1[2] | 0.25[4] | 0.25[6] | 0.25[4] | 0.25[8] | 0.05[2] |
| Total clay, % of formula | 50 | 60 | 60 | 65 | 70 | 75 |

[1] 2-Amino-2-methyl-1-propanol (AMP)
[2] Hydroxyethyl cellulose
[3] AMP 0.3%, and ethanolamine, 0.1%
[4] Bentonite
[5] Tamol-731, 0.3%, and Triton X-100, 0.2%
[6] Low-viscosity methyl cellulose
[7] n-Butylamine 0.2%, Triethanolamine 0.3%, KOH 0.2% AMP 0.6%
[8] Sodium polyacrylate 0.7% and carboxymethyl cellulose 0.05%
[9] AMP 0.8% and n-butylamine 0.25%
[10] Sodium polyacrylate

TABLE 2

| EXAMPLE No. | 1 | 2 | 3 | 4 | 5 | 6 |
|---|---|---|---|---|---|---|
| Clay, hydrite % | 8% | 12% | 20% | 16% | 17.5% | 20% |
| % of total clay | 16 | 20 | 33.3 | 24.6 | 25 | 26.7 |
| Clay, calcined % | 42 | 48 | 40 | 49 | 52.5 | 55 |
| Ratio C/H* | 5.25 | 4.0 | 2 | 3.06 | 2.75 | 2.75 |
| Water % | 49.6 | 39.45 | 39.45 | 33.65 | 29.25 | 23.94 |
| Dispersant % | 0.2[1] | 0.4[3] | 0.5[5] | 1.3[7] | 0.7[10] | 1.05[9] |
| Suspending agent % | 0.2[2] | 0.05[4] | 0.05[6] | 0.05[4] | 0.05[8] | 0.01[2] |
| Total clay % | 50 | 60 | 60 | 65 | 70 | 75 |

*Calcined (C) to hydrite (H)
[1] 2-Amino-2-methyl-1-propanol (AMP)
[2] Hydroxyethyl cellulose
[3] AMP 0.3%, and ethanolamine, 0.1%
[4] Bentonite
[5] Tamol-731, 0.3%, and Triton X-100, 0.2%
[6] Low-viscosity methyl cellulose
[7] n-Butylamine 0.2%, Triethanolamine 0.3%, KOH 0.2%, AMP 0.6%
[8] Sodium polyacrylate 0.7% and carboxymethyl cellulose 0.05%
[9] AMP 0.8% and n-butylamine 0.25%
[10] Sodium polyacrylate

I claim:

1. An aqueous slurry of kaolin clay, water, a suspending agent and a dispersant and exhibiting minimum settling, the clay portion consisting essentially of calcined kaolin clay and hydrated kaolin clay in a ratio of about 2.75 parts of said calcined clay to one of said hydrated clay at a total clay content of about 75%.

2. An aqueous slurry of kaolin clay, water, a suspending agent and a dispersant and exhibiting minimum settling, the clay portion consisting essentially of calcined kaolin clay, about 245 parts, and hydrated kaolin clay, about 80 parts, for a ratio of about 3:1 at a total clay content of about 65%.

3. An aqueous slurry of kaolin clay, water, a suspending agent and a dispersant and exhibiting minimum settling, the clay portion consisting essentially of calcined kaolin clay, about 262.5 parts, and hydrated kaolin clay, about 87.5 parts, for a ratio of about 3:1 at a total clay content of about 70%.

* * * * *

UNITED STATES PATENT OFFICE
CERTIFICATE OF CORRECTION

Patent No. 4,017,324            Dated April 12, 1977

Inventor(s) Warren J. Eggers

It is certified that error appears in the above-identified patent and that said Letters Patent are hereby corrected as shown below:

Column 1, line 23, "accure" should read -- accrue --.

Column 3, Table 2, Heading No. 5, line 4, "2.75" should read -- 3.0 --.

Column 3, Table 2, Heading No. 6, line 4, insert -- 2.75 --.

Signed and Sealed this twelfth Day of July 1977

[SEAL]

Attest:

RUTH C. MASON
*Attesting Officer*

C. MARSHALL DANN
*Commissioner of Patents and Trademarks*